United States Patent Office 3,341,487
Patented Sept. 12, 1967

3,341,487
PROCESS FOR STOPPING EMULSION POLYMERIZATIONS BY THE ADDITION OF DITHIOCARBAMATE SALTS AND ALKYL HYDROXYL AMINES
Harry E. Albert, Lafayette Hill, Alfred C. Whiton, Blue Bell, and Benjamin S. Garvey, Jr., Wayne, Pa., assignors to Pennsalt Chemicals Corporation, Philadelphia, Pa., a corporation of Pennsylvania
No Drawing. Filed July 21, 1964, Ser. No. 384,232
14 Claims. (Cl. 260—29.7)

This invention relates to an improved process for short-stopping polymerization processes employing ethylenically unsaturated monomers and deals particularly with those polymerization processes for making synthetic rubber latices.

Synthetic rubber latices are prepared commercially by emulsion polymerization of rubber forming monomers, and the polymerization must be stopped to get a product of the desired optimum characteristics. Much study has been made toward finding good short stops and numerous compounds have been found quite useful. However, the compounds used heretofore have certain disadvantages and are not generally satisfactory with all types of polymerization systems. For example, hydroquinone has been used in hot butadiene-styrene systems, but it does not satisfactorily short stop cold rubber polymerization processes where a more powerful initiator (e.g. hydroperoxide) is used. Although dinitrochlorobenzene has been used in cold rubber processes it has the severe disadvantage of causing discoloration of the rubber; it is also water insoluble and so toxic as to be a serious health problem to workers in the plant. Alkali metal salts, particularly the sodium salts of dithiocarbamates (e.g. sodium dimethyldithiocarbamates) have been used quite successfully in both hot and cold polymerization recipes, but this compound has the disadvantages of causing some polymer discoloration and of being oxidized to a thiuram disulfide which remains in the finished rubber and causes undesirable and uncontrollable variation in vulcanization rate. The latter undesirable feature of the use of dithiocarbamates is probably due, at least in part, to the fact that in order to obtain stopping action with dithiocarbamates, a relatively large amount (about 0.15 part per 100 parts of monomer) must be used in the polymerization recipe. Hydroxylamine and hydroxylamine salts, such as sulfate and hydrochloride, have also been disclosed as short stops for persulfate catalyzed emulsion polymerization processes, but they are not considered sufficiently effective for commercial use in cold polymerization systems.

Recently, it has been discovered that N,N-dialkylhydroxylamines are extremely efficient short stops, and these materials are now beginning to enjoy commercial acceptance as the short stop of preference. These dialkylhydroxylamines are effective at very low concentrations, are water soluble, non-toxic, cause no equipment corrosion problems, and cause no discoloration to the polymer product. However, in our investigations in the field of rubber polymerizations we have discovered that the use of an N,N-dialkylhydroxylamine alone as a short stop results in some undesirable features which are reflected in the final rubber composition produced.

One of the problems encountered in the use of an N,N-dialkylhydroxylamine alone as a short stop in synthetic rubber polymerization systems is that the rubber obtained will sometimes not have the storage stability required for an acceptable commercial product. It is not understood why this occurs nor is it understood why it frequently occurs intermittently. One of the manifestations of this reduced stability of the polymer whose polymerization is stopped with the N,N-dialkylhydroxylamines is the development of some slight color of the rubber on long standing. A second manifestation is the fact that the surface of the elastomer hardens more quickly than would normally be expected. Further, the stored elastomer will sometimes develop considerable tensile strength indicating an increasing state of cure.

It has now been found in accord with this invention that these disadvantages may be alleviated or completely eliminated by employing as a stopping agent in both hot and cold emulsion polymerization systems, an N-mono- or an N,N-dialkylhydroxylamine in combination with a polymer stabilizing amount, but less than a short-stopping amount of a dithiocarbamate. It is quite unexpected that the use of a dithiocarbamate in an amount less than that which effects short-stopping will overcome the adverse effects of the alkylhydroxylamine stopping agents.

Another embodiment of this invention is an aqueous solution useful for stopping emulsion polymerizations which contains from about 1% to about 40% by weight of a mixture of water soluble N,N-di-lower alkyldithiocarbamate and alkylhydroxylamine.

The alkylhydroxylamines which are useful in the invention will be those having the structure

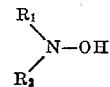

where $R_1$ is a member selected from the group consisting of hydrogen, alkyl and cycloalkyl, $R_2$ is a member of the group consisting of alkyl and cycloalkyl and wherein the organic $R_1$ and $R_2$ groups contain up to eighteen carbon atoms. Thus, specific compounds which are operable in the invention will include N,N-diethylhydroxylamine, N-methylhydroxylamine, N,N-dimethylhydroxylamine, N-ethylhydroxylamine, N,N-diisopropylhydroxylamine, N,N-dibutylhydroxylamine, N-butylhydroxylamine, N-amylhydroxylamine, N-hexylhydroxylamine, N-cyclohexylhydroxylamine, N,N-dicyclohexylhydroxylamine, N,N-diamylhydroxylamine, N-methyl-N-ethylhydroxylamine, N-methyl-N-cyclohexylhydroxylamine, N,N-didecylhydroxylamine, N,N - dioctylhydroxylamine, N - octylhydroxylamine, N - octadecylhydroxylamine, N,N - di-octadecylhydroxylamine, and the like.

These hydroxylamines are known and may be prepared by any one of several known methods, as for example by converting the appropriate tertiary amine to the amine oxide and pyrolyzing the oxide to the N,N-dialkylhydroxylamine as disclosed by Cope et al. in J. Am. Chemical Society, vol. 79, page 964 (1957). N-cycloaliphatic hydroxylamines, such as cyclohexylhydroxylamine and its related compounds, may be prepared by the method described in Canadian Patent 588,865, issued Dec. 15, 1959.

It will be understood that any N,N-di-lower alkyl dithiocarbamate ion will be useful in the invention and any water soluble salt of such an ion may be used. The salts of dithiocarbamic acids are characterized by the structural formula:

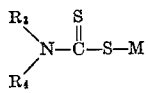

where $R_3$ and $R_4$ are lower alkyl groups containing from 1 to 6 carbon atoms and M is a member selected from a group consisting of alkali metals, ammonium, and substituted ammonium. Examples of such salts will include the alkali metal salts as for example, lithium, sodium, potassium, and the like salts of N,N-dimethyldithiocarbamate, N,N-dibutyldithiocarbamate, N,N-dihexyldithiocarbamate, and the like; the ammonium salts of such dithiocarbamates, substituted amine salts such as the N,N-di-lower alkyl dithiocarbamate salts derived from methylamine, dimethylamine, ethylamine, diethylamine, butylamine, dibutylamine, and the like.

In carrying out the process of the invention conventional polymerization recipes may be used and the shortstop combination will be added in the usual manner. Hot synthetic rubber recipes (persulfate or azonitrile initiated) or cold synthetic rubber recipes (hydroperoxide initiated) may be used. The polymerizable material for preparing synthetic rubber latices may be, as is well known, any one or more conjugated diolefins or their admixture with the copolymerizable monomer. The conjugated diolefins are exemplified by the butadienes such as butadiene-1,3, isoprene, chloroprene, cynaobutadiene-1,3; 2-phenylbutadiene, piperylene, 2,3-dimethylbutadiene-1,3, and the like. The copolymerizable monomer, which will normally comprise up to about 70% of the mixture, will be a monoolefin containing a single $CH_2=C<$ group having at least one of the free valence bonds attached to an electronegative group. Such olefins include aryl olefins such as styrene, vinyl naphthalene, α-methylstyrene, p-chlorostyrene, etc.; the α-methylene carboxylic acids and their esters, amides and nitriles such as acrylic acid, methacrylic acid, acrylonitrile, methacrylamide, and the like. Thus, the synthetic rubber may be any butadiene polymer latex. However, it will be understood that the combination of N,N-dialkylhydroxylamines and dithiocarbamates may also be used in accord with this invention to stop polymerization of other ethylenically unsaturated monomers which yield nonelastomeric latices. Thus, this invention may also be used in the polymerization of vinyl and vinylidene halides (e.g. vinyl chloride, vinylidene fluoride, etc.), acrylates, methacrylates and acrylamides (methyl acrylate, glycidyl methacrylate, methacrylamide, etc.), vinyl esters (e.g. vinyl acetate, etc.), and in fact in any addition polymerization system where polymerization proceeds through a free radical mechanism.

The amount of short-stop combination that will be used will vary somewhat in order to obtain the optimum benefits in accord with this invention. The amount of the alkylhydroxylamine employed will vary from about 0.01 to about 0.15 phm. (parts by weight per 100 parts of monomer), and the amount of dithiocarbamate that will be used will be less than that required to stop the polymerization and will generally vary from about .03 to about 0.10 phm.

The manner by which the short-stops will be added will be in accord with conventional techniques used in rubber polymerization processes. Preferably an aqueous solution of the dithiocarbamate and the alkylhydroxylamine will be prepared as described and the appropriate amount of the aqueous solution added to the polymerization reaction mass when the desired conversion is obtained. Alternatively either the dithiocarbamate or the alkylhydroxylamine may be added separately and in any order, but, as indicated, the preferred technique is to add them both at the same time by means of an aqueous solution.

The preferred aqueous solution will be one containing about 5% by weight of a mixture of the N-alkylhydroxylamine and N,N-dialkyldithiocarbamate. As indicated above, the amounts of N-alkylhydroxylamine that will be employed in the polymerization emulsion for stopping will be from about 0.01 to about 0.15 phm. and that of the dithiocarbamate in an amount of from about 0.03 to about 0.10 phm. and the amounts of the agents in the aqueous solution will be maintained in the same weight ratio; i.e. a ratio of N-alkylhydroxylamine to dithiocarbamate of about 0.1:1.0 to 5.0:1.0, preferably about 0.1:1.0 to 3.0:1. Aqueous solutions as described will be useful articles of commerce and may be safely stored until used in the application of this invention.

The beneficial effects obtained by this invention reside in certain physical properties of the uncured elastomer, which benefits manifest themselves during storage prior to actual fabrication of the elastomer into useful goods. In the absence of the dithiocarbamate; that is, by use of the alkylhydroxylamines alone as stopping agents, the rubber product tends to discolor on storage, but when the combination is used in accord with this invention this discoloration is very much mitigated or completely eliminated. Another undesirable property which manifests itself in the stored rubber when the alkylhydroxylamine stopping agent is used alone is in the surface condition of the rubber in that it becomes hard, losing its softness to the touch. Related to this is the relative state of cure which is evident by an increase in tensile strength of the rubber on storage when an alkylhydroxylamine stopping agent is used alone. On the other hand, by combining an N,N-di-lower alkyl dithiocarbamate with an alkylhydroxylamine as described above and in accord with this invention, the surface condition of the elastomer remains soft or develops no significant hardness and the relative state of cure remains essentially as its initial condition in that little or no tensile strength develops. Still another difficulty that occurs with elastomers processed by use of alkylhydroxylamines alone as stopping agent is that there is an increase in the Mooney viscosity of the stored elastomer. Surprisingly, the use of a small amount of dithiocarbamate in conjunction with the alkylhydroxylamine reduces or eliminates the Mooney viscosity rise, thus indicating the improved stability of the polymer.

In order to more fully illustrate the invention, the following examples are given:

*Evaluation techniques*

Evaluation of the stopping agent combinations was carried out using a sulfoxylate initiated styrene-butadiene rubber test recipe (similar to that described in "Synthetic Rubber" by G. S. Whitby, John Wiley and Sons, Inc., New York, 1954, p. 217) which was polymerized in beverage bottles at 5° C. The polymerization charge had the following composition:

| Ingredients: | Amount (grams) |
|---|---|
| Butadiene | 18 |
| Styrene | 7 |
| Water | 50 |
| Tert-dodecyl mercaptan (modifier) | 0.058 |
| Potassium soap of disproportionated rosin acids 80% solids ("Dresinate" 515) | 1.125 |
| Sodium salt of polymerized alkylnaphthylene sulfonate ("Dexad" 11) | 0.038 |
| Tetrasodium salt of ethylene diamine tetraacetic acid (sequestering agent) | 0.008 |
| p-Menthane hydroperoxide | 0.011 |
| $FeSO_4 \cdot 7H_2O$ | 0.0056 |
| $Na_3PO_4 \cdot 12H_2O$ | 0.20 |
| Sodium sulfoxylate formaldehyde | 0.0169 |

The individual bottles of this recipe were polymerized at 5° C. to a conversion in the 55-60% range and then the stopping agent or stopping agent combination was added by injecting an aqueous solution containing it through the self-sealing synthetic rubber cap liner with a hypodermic syringe. Without adding any polymer stabilizer each bottle of latex was then crumb-coagulated in the usual manner with salt and sulfuric acid and dried 24 hours at 50° C., thus providing dry samples free of any stabilizer except the small amount of retained stopping agent.

Samples of dry crumb (2-3 g. each) prepared in the above manner were subjected to an oven aging test at 80° C. to determine the relative stability of each sample in each series. The samples were inspected visually and by touch at periodic intervals during the test for three criteria which are indicative of the polymer's stability; inspection was made for changes in color, surface softness and relative state of cure. By means of this test it was apparent which stopping agents and stopping agent combinations used in the original recipe to prepare the samples contributed the most to the storage stability of the dry polymer crumb. The better samples resisted change in the properties mentioned during the oven aging period.

EXAMPLE 1

The following table indicates the results obtained under various conditions of evaluation and with various stopping agents and combinations:

TABLE I

| Stopping Agent and Time of Aging at 80° C. | Color | Surface condition | Relative State of Cure |
|---|---|---|---|
| 0.02 phm. N,N-diethylhydroxylamine: | | | |
| Initial | Off white | Resilient | Consid. tensile. |
| 8 hrs | do | do | Do. |
| 24 hrs | Lt. tan | Sl. hardness. | Do. |
| 72 hrs | do | Hard | Do. |
| 120 hrs | Tan | do | Do. |
| 0.02 phm. N,N-diethylhydroxylamine plus 0.10 phm. sodium dimethyldithiocarbamate: | | | |
| Initial | Off white | Soft | No tensile. |
| 8 hrs | do | do | Do. |
| 24 hrs | do | do | Do. |
| 72 hrs | do | do | Do. |
| 120 hrs | do | Sl. hardness. | Sl. tensile. |
| 0.02 phm. N,N-diethylhydroxylamine plus 0.05 phm. diethylammonium diethyldithiocarbamate: | | | |
| Initial | Off white | Soft | No tensile. |
| 8 hrs | do | do | Do. |
| 24 hrs | do | do | Do. |
| 72 hrs | do | do | Do. |
| 120 hrs | do | Sl. hardness. | Sl. tensile. |

It is clear from the data in the above table that the use of N,N-diethylhydroxylamine alone causes the development of color, surface hardness and a state of cure in the aged samples. It is also clear that the addition of the dithiocarbamate significantly mitigates these undesirable properties.

EXAMPLE 2

Another series of evaluations is shown in Table II.

The data in Table II illustrates the stabilizing effects of the combination of alkylhydroxylamines with dithiocarbamates over the alkylhydroxylamine short-stops alone. In every case it is observed that the overall aging effects are mitigated when dithiocarbamate is present.

TABLE II

| Stopping Agent and Time of Aging at 80° C. | Color | Surface condition | Relative State of Cure |
|---|---|---|---|
| 0.02 phm. N,N-diethylhydroxylamine: | | | |
| Initial | White | Sl. resilient | Moderate tensile. |
| 8 hrs | Lt. yellow | do | Do. |
| 24 hrs | do | Resilient | Do. |
| 72 hrs | Lt. tan | do | Do. |
| 168 hrs | Tan | Hard | Considerable tensile. |
| 0.02 phm. N,N-diethylhydroxylamine plus 0.05 phm. sodium dimethyldithiocarbamate: | | | |
| Initial | Off white | Soft | No tensile. |
| 8 hrs | do | Soft, sl. tacky. | Do. |
| 24 hrs | do | Sl. resilient | Sl. tensile. |
| 72 hrs | Lt. tan | Resilient | Moderate tensile. |
| 168 hrs | Tan | Hard | Do. |
| 0.02 phm. N,N-diethylhydroxylamine plus 0.05 phm. diethylammonium diethyldithiocarbamate: | | | |
| Initial | Off white | Soft | No tensile. |
| 8 hrs | do | do | Do. |
| 24 hrs | do | do | Do. |
| 72 hrs | do | do | Do. |
| 168 hrs | Tan | Resilient | Moderate tensile. |
| 0.02 phm. N,N-diethylhydroxylamine plus 0.05 phm. dibutylammonium dibutyldithiocarbamate: | | | |
| Initial | Off white | Soft | No tensile. |
| 8 hrs | do | do | Do. |
| 24 hrs | Lt. tan | do | Do. |
| 72 hrs | do | do | Do. |
| 168 hrs | do | Resilient | Moderate tensile. |

EXAMPLE 3

A hot rubber recipe (SBR-1000) of the following composition:

| | Parts by weight |
|---|---|
| Water | 45.0 |
| Sodium fatty acid soap | 1.18 |
| $K_2S_2O_8$ | 0.063 |
| Modifier (tert-dodecylmercaptan) | 0.075 |
| Butadiene | 18.0 |
| Styrene | 7.0 | was polymerized and stopped at about 40% conversion by adding a 5% by weight aqueous solution containing a 1:1 mixture of N-cyclohexylhydroxylamine and sodium dimethyldithiocarbamate, said solution being added in an amount to obtain 0.04 phm of each of the active agents. Polymerization was effectively stopped and the storage stability of the coagulated polymer was excellent.

EXAMPLE 4

An acrylonitrile-butadiene polymerization carried out with the following recipe:

| | Parts by weight |
|---|---|
| Butadiene | 72 |
| Acrylonitrile | 28 |
| Water | 180 |
| Sodium fatty acid soap | 4.5 |
| Stearic acid | 0.6 |
| Mercaptan | 0.40 |
| KCl | 0.3 |
| $K_4P_2O_7$ | 0.1 |
| $Fe_2(SO_4)_3$ | 0.02 |
| $K_2S_2O_8$ | 0.4 | was effectively stopped at 75% conversion with a mixture of 0.02 phm. of N,N-dibutylhydroxylamine and 0.05 phm. of ammonium diethylthiocarbamate. The copolymers obtained showed excellent stability under accelerated storage tests.

EXAMPLE 5

This example illustrates the fact that at the low concentration at which the dithiocarbamates are used in this invention, they have no short-stopping effects and that they unexpectedly stabilize the polymer against crosslinking as shown by Mooney viscosity data:

Using the polymerization system described in Example 1, polymerization was stopped in two separate tests with sodium dimethyldithiocarbamate and with N,N-diethylhydroxylamine. The data is shown in the following table:

| Run No. | Shortstop | Percent conversion | |
|---|---|---|---|
| | | When stopped | Conversion after 18 hrs. at room temp. |
| 1 | 0.02 phm. N,N-diethylhydroxylamine | 57.0 | 59.0 |
| 2 | 0.02 phm. sodium dimethyldithiocarbamate. | 61.6 | 75.6 |
| 3 | 0.05 phm. sodium dimethyldithiocarbamate. | 57.0 | 75.3 |
| 4 | 0.05 phm. dibutylammonium dibutyldithiocarbamate. | 57.0 | 75.8 |
| 5 | 0.02 phm. N,N-diethylhydroxylamine plus 0.05 dibutylammonium dibutyldithiocarbamate. | 57.0 | 59.5 |

The data of runs 2, 3 and 4 show that after the dithiocarbamate was added, conversion of monomers to polymer continued. Thus, at the concentration used, the dithiocarbamate is not effective as a short-stop. Runs 1 and 5, however, show that the polymerization is stopped effectively with 0.02 phm. N,N-diethylhydroxylamine, either alone or with dithiocarbamate.

Polymer of Runs No. 1 and 2 was coagulated from fresh latex and from latex aged for seven weeks to three months and the polymers were subjected to Mooney viscosity measurements with the following results:

| Shortstopper | Mooney Viscosity, ML 1'+4' | |
|---|---|---|
| | Polymer from fresh latex | Polymer from aged latex |
| 0.02 phm. N,N-diethylhydroxylamine | 24.5 | 46.0 |
| 0.02 phm. sodium dimethyldithiocarbamate. | 53.0 | 63.0 |
| 0.05 phm. dibutylammonium dibutyldithiocarbamate. | 52.5 | 64.0 |

It is clear that N,N-diethylhydroxylamine had no stabilizing effect on Mooney viscosity values, nor did the dithiocarbamates at the concentrations used. On the other hand, when a combination of 0.02 phm. of N,N-diethylhydroxylamine and 0.05 phm. of dibutylammonium dibutyldithiocarbamate was evaluated in the same test no Mooney viscosity rise on polymer from aged latex was evident.

In like manner 0.02 phm. N,N-diethylhydroxylamine and 0.05 phm. of sodium dimethyldithiocarbamate showed no Mooney viscosity rise on polymer from aged latex.

It will be understood that numerous changes and modifications may be made from the above description of the invention and the illustrative examples without departing from its spirit and scope.

We claim:

1. In the process of polymerizing a conjugated diolefin monomer and terminating the polymerization by the addition of a stopping agent, the improvement which comprises stopping said polymerization with a water soluble dithiocarbamate and an alkylhydroxylamine of structure

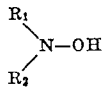

where $R_1$ is a member selected from the group consisting of hydrogen, alkyl and cycloalkyl, $R_2$ is a member of the group consisting of alkyl and cycloalkyl, and where the organic $R_1$ and $R_2$ groups contain up to 18 carbon atoms, said alkylhydroxylamine being used in an amount from about 0.01 to about 0.15 part per hundred parts of monomer and the amount of dithiocarbamate being an amount sufficient to improve the stability of the polymer, but less than that required to stop the polymerization, said amount of dithiocarbamate being between about 0.03 to about 0.10 part per hundred parts of monomer.

2. In the process of preparing a synthetic rubber latex by polymerizing a conjugated diolefin with a second ethylenically unsaturated monomer and terminating the polymerization by the addition of a stopping agent, the step which comprises stopping the polymerization with a mixture comprising 0.01 to about 0.15 part per hundred parts of monomer of an alkylhydroxylamine having the structure

where $R_1$ is a member selected from the group consisting of hydrogen, alkyl and cycloalkyl, $R_2$ is a member of the group consisting of alkyl and cycloalkyl, and wherein the organic $R_1$ and $R_2$ groups contain up to 18 carbon atoms, and a polymer stabilizing amount, but less than short-stopping amount, of a water-soluble N,N-di-lower alkyldithiocarbamate salt, said amount of dithiocarbamate being between about 0.03 to about 0.10 part per hundred parts of monomer.

3. In the process of preparing a cold butadiene-styrene synthetic rubber latex, the improvement which comprises the step of stopping the polymerization with a mixture comprising 0.01 to about 0.15 part per hundred parts of monomer of an alkylhydroxylamine having the structure

where $R_1$ is a member selected from the group consisting of hydrogen, alkyl and cycloalkyl, $R_2$ is a member of the group consisting of alkyl and cycloalkyl, and wherein the organic $R_1$ and $R_2$ groups contain up to 18 carbon atoms, and a polymer stabilizing amount, but less than short stopping amount, of a water-soluble N,N-di-lower alkyl dithiocarbamate salt, said amount of dithiocarbamate being between about 0.03 to about 0.10 part per hundred parts of monomer.

4. In the process of preparing a cold butadiene-styrene synthetic rubber latex, the improvement which comprises stopping the polymerization with from 0.01 to about 0.15 part per hundred parts of monomer of N,N-diethylhydroxylamine and from about 0.03 to about 0.10 part per hundred parts of monomer of an alkali metal N,N-di-lower alkyldithiocarbamate.

5. The process of claim 4 wherein the stopping agent is an aqueous solution of N,N-diethylhydroxylamine and the sodium salt of dimethyldithiocarbamate.

6. The process of claim 4 wherein the stopping agent is an aqueous solution of N,N-diethylhydroxylamine and diethylammonium diethyldithiocarbamate.

7. The process of claim 4 wherein the stopping agent is an aqueous solution of N,N-diethylhydroxylamine and dibutylammonium dibutyldithiocarbamate.

8. An aqueous solution useful for stopping emulsion polymerizations which contains from about 1% to 40% by weight of a mixture of a water soluble N,N-di-lower-alkyldithiocarbamate and an N-alkylhydroxylamine having the structure

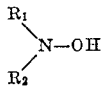

where $R_1$ is a member selected from the group consisting of hydrogen, alkyl and cycloalkyl, $R_2$ is a member of the group consisting of alkyl and cycloalkyl wherein the organic $R_1$ and $R_2$ groups contain up to 18 carbon atoms, the weight ratio of said N-alkylhydroxylamine to said dithiocarbamate being from about 0.1:1 to 5:1.

9. An aqueous solution as in claim 8 containing about 5% by weight of said mixture.

10. An aqueous solution as in claim 9 wherein the N-alkylhydroxylamine is an N,N-diethylhydroxylamine.

11. An aqueous solution useful for stopping emulsion polymerizations which consist of about 5% by weight of a mixture of N,N-diethylhydroxylamine and an N,N-di-lower-alkyldithiocarbamate wherein the weight ratio of said N,N-diethylhydroxylamine and dithiocarbamate is between about 0.1:1 and 3.0:1.

12. A composition as in claim 11 wherein the dithiocarbamate is sodium dimethyldithiocarbamate.

13. A composition as in claim 11 wherein the dithiocarbamate is diethylammonium diethyldithiocarbamate.

14. A composition as in claim 11 wherein the dithiocarbamate is dibutylammonium dibutyldithiocarbamate.

References Cited
UNITED STATES PATENTS 2,662,876  12/1953  Antlfinger _____ 260—82.7
3,148,225  9/1964  Albert _____ 260—669

MURRAY TILLMAN, *Primary Examiner.*

J. ZIEGLER, *Assistant Examiner.*